United States Patent Office 3,706,669
Patented Dec. 19, 1972

3,706,669
COMPOSITION AND METHOD FOR THE
DISSOLUTION OF GYPSUM
Tommy R. Gardner, Duncan, Okla., assignor to
Halliburton Company, Duncan, Okla.
No Drawing. Filed Mar. 16, 1970, Ser. No. 20,046
Int. Cl. C23g 1/02
U.S. Cl. 252—82                        11 Claims

ABSTRACT OF THE DISCLOSURE

The present invention relates to a composition and method for the dissolution of gypsum wherein said gypsum is contacted with a solution which converts it into a dispersible sludge.

---

The present invention relates generally to a composition and method for use in converting gypsum scales or deposits to a dispersible sludge.

Undesirable deposits of gypsum ($CaSO_4.2H_2O$) occur frequently in industrial boilers, heat exchangers, water systems and in subterranean formations used as a source of water and hydrocarbons. The deposits generally cause clogging or reduced flow in the water system or earthen formations where they are found.

Gypsum deposits are found in producing wells, injection wells, and waste disposal. Deposits of gypsum can significantly reduce the flow of oil and water into the wellbore by plugging-off perforation in the tubing and/or casing. In addition, downhole pumps can become stuck as a result of gypsum scale deposition. Gypsum deposit can form on the surface of tubular goods in the well in such a manner as to severely impede production of fluids.

Two general types of more or less effective compositions have been used in the past to remove gypsum deposits. Carbonate solutions have been used to convert gypsum to calcium carbonate which is then removed with an acid. Besides requiring the use of an acid to dissolve the calcium carbonate, the carbonate compositions show reduced effectiveness on dense, laminated gypsum scales, requiring repeated treatments with the carbonate composition and repeated washings with an acid. Acids are generally undesirable in that they may be corrosive to the system or formation from which the gypsum deposit is sought to be removed.

Sodium and potassium hydroxides have also been used with some effectiveness to remove gypsum deposits. The hydroxide converts the gypsum to calcium hydroxide which is soluble in acid. In some cases the calcium hydroxide will be in the form of a sludge which may be pumped or washed away from the system or formation, while in other instances, acid must be used to remove the reaction precipitate from the well. Although a fair degree of success has been obtained with the hydroxides, in some cases the hydroxides tend to decrease effectiveness with repeated treatments, partially because of a buildup of the calcium hydroxide sludge within the system and because of the hydroxide coating formed on the surface of the gypsum deposit. The hydroxides also sometimes require the undesirable use of an acid to wash away the reaction precipitate.

The present invention relates to a solution for the conversion of gypsum deposits to a dispersible sludge comprising the salt of an alkali metal and a monocarboxylic acid and the method of its use.

The present invention provides a composition and method for converting gypsum deposits to a dispersible sludge, eliminating the necessity of an acid treatment to disperse the treated gypsum deposits and greatly improving the efficiency in pounds of gypsum removed per gallon of solution used over the prior art.

The said solution, when in contact with a gypsum deposit, will react with the gypsum in such a way as to form a precipitate, klauzite, which will slough away from the surface of the gypsum, thereby increasing the penetration of the solution. When the solution contacts the gypsum deposit, the following reaction is thought to occur:

$$2CH_3COOK + 2CaSO_4.2H_2O \rightarrow$$
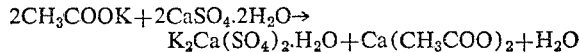
$$K_2Ca(SO_4)_2.H_2O + Ca(CH_3COO)_2 + H_2O$$

Potassium acetate, the most preferred chemical composition, is used in the above sample reaction.

Because the klauzite, $K_2Ca(SO_4)_2.H_2O$, does not adhere tightly to the gypsum deposit and is readily dispersible in water, an acid stage is not necessary after treating with the solution of the invention.

It is an advantage of the solution of this invention that no subsequent acid treatment is needed, the precipitate being a dispersible sludge. However, should an acid treatment following the use of the solution of the invention be desirable for cleaning or some other purpose, the klauzite is soluble in acid to the extent of 1.2 pounds per gallon in 15% HCl. Klauzite is soluble in water to the extent of 0.0207 pound per gallon.

The klauzite which forms as the solution of this invention reacts with the gypsum deposits does not adhere tightly to the said deposit, but sloughs away, overcoming the disadvantage of gypsum removal solutions which form a reaction product that tightly adheres to the said deposit, thereby stopping the reaction and requiring an acid to remove said reaction product.

Increased efficiency of gypsum removal is another advantage of the solution of this invention. At 72° F. a gypsum solvent having a concentration of 30% of the solution of the present invention will convert to a dispersible sludge 1.2 pounds per gallon of gypsum, while sodium hydroxide followed by an acid will remove only .50 pound per gallon of the same type gypsum, and sodium carbonate followed by an acid will remove .35 pound of gypsum per gallon of solution during a 24-hour period. The solution of the invention also shows a marked increase in efficiency over the hydroxide gypsum removal solutions, as well as over the carbonate gypsum removal solutions on various samples of gypsum with the increase in efficiency widening with time. The solution of this invention shows an efficiency improvement of up to five times the ability to remove gypsum over solvents commonly used in the art.

The solution of this invention will operate in a pH range of from about pH 6 to about pH 14 to convert gypsum deposits to a dispersible sludge; however, the preferred pH range is found to be 9 to 11 and most preferred pH is 10. Although the gypsum removal solution of this invention works well in a basic environment, a difference of about .44 pound per gallon is noticed in the ability of said solution to remove gypsum deposits at a pH of about 6 and at a pH of about 12, with the maximum removal ability found at about pH 10 in most cases.

The concentrations of the monocarboxylic acid salt, potassium acetate, varies from 0.5% by weight to 75% by weight depending on the amount of gypsum to be removed, the system from which it is to be removed and the anticipated agitation of the solution of the present invention in the presence of the gypsum deposit. Cleaning a thin layer of gypsum deposit from a large volume boiler might require a concentration of potassium acetate from about 1.0% to about 5.0% while cleaning gypsum deposits from subterranean formation or oil well producing equipment could require a concentration of potassium acetate ranging from about 10% to about 75%. Higher concentrations of the elements of this invention and increased temperatures appear to increase its rate of operation.

The preferred elements of the composition of this invention is the potassium salt of acetic acid in an aqueous solution. Other compositions of alkali metals and monocarboxylic acids may be used effectively in water, e.g., the ammonium, sodium and potassium salts of formic and propionic acids and including the ammonium and sodium salts of acetic acids.

Gypsum deposits are removed by contacting the said deposits with the solution of the invention for a time sufficient to convert said deposits to a pumpable sludge and by removing the dispersible sludge after the said solution has converted the said deposits. The details of the process will vary depending on the system from which the gypsum deposits are to be removed.

Although the solution of the present invention is most often used in aqueous solutions, it is advantageous to form a dispersion or emulsion of the monocarboxylic salt with an aromatic solvent such as xylene or a straight-chain organic solvent such as kerosene or diesel to aid in removing paraffins and congealed oil which may be co-deposited with the gypsum deposit.

The invention will be further illustrated by the following examples. It should be understood, however, that although these examples may describe, in particular detail, some of the more specific features of the invention, they are given primarily for the purpose of illustration; and the invention in its broader aspects is not to be construed as limited by the following examples.

TEST PROCEDURE

The gypsum solubility tests described below are conducted by placing a weighed gypsum block in contact with 100 cubic centimeters of the solution described in the invention for periods of 24, 48 and 72 hours at 72° F. After soaking for 24 hours, the gypsum cube is removed from the solvent, washed with water, dried with acetone and reweighed. The same procedure of washing with water, drying with acetone and reweighing is used to determine the weight loss of the test cube at 48 and 72 hours, respectively.

EXAMPLE 1

Table I shows the amount of gypsum removed in grams per 100 cubic centimeters and pounds per gallon of various concentrations of potassium acetate while varying the pH and solvation time. A solution containing 32.73% potassuim acetate salt (weight to weight) with the pH of 8 will remove approximately 0.53, 0.85 and 0.99 pound of gypsum per gallon solution in 24, 48 and 72 hours respectively at ambient temperatures under static conditions. A solution containing 49.02% potassium acetate salt (weight to weight) at a pH of 8 completely disintegrated the test block.

TABLE I.—DISSOLUTION [1] OF GYPSUM IN VARIOUS CONCENTRATIONS OF POTASSIUM ACETATE WHILE VARYING pH

| Acid salt | Percent acid salt by weight | pH | CaSO$_4$·2H$_2$O dissolved | | | | | | Comments |
|---|---|---|---|---|---|---|---|---|---|
| | | | Gms. after— | | | Lbs./gal. after— | | | |
| | | | 24 hr. | 48 hr. | 72 hr. | 24 hr. | 48 hr. | 72 hr. | |
| Potassium acetate | 16.34 | 6.0 | 2.0 | 2.8 | | .16 | .23 | | |
| | | 8.0 | 2.2 | 2.9 | | .18 | .24 | | |
| | | 10.0 | 1.6 | 4.1 | | .13 | .34 | | |
| | | 12.0 | 0.3 | 1.4 | | .025 | .11 | | |
| Potassium acetate | 16.34 | 6.0 | 2.0 | 3.9 | | .16 | .32 | | |
| | | 8.0 | 1.8 | 3.9 | | .15 | .32 | | |
| | | 10.0 | 2.3 | 5.0 | | .19 | .41 | | |
| | | 12.0 | 1.3 | 2.4 | | .10 | .20 | | |
| Potassium acetate | 32.78 | 6.0 | 6.5 | 9.5 | 11.5 | .54 | .79 | .95 | |
| | | 8.0 | 5.9 | 10.6 | 12.6 | .49 | .88 | 1.05 | |
| | | 10.0 | 5.4 | 9.0 | 11.0 | .45 | .75 | .91 | |
| | | 12.0 | 2.7 | 9.0 | 12.0 | .22 | .75 | 1.0 | Block was soft and crumbly after 48 hrs. |
| Potassium acetate | 32.78 | 6.0 | 5.4 | 9.1 | 11.2 | .45 | .75 | .93 | |
| | | 8.0 | 6.4 | 10.2 | 11.9 | .53 | .85 | .99 | |
| | | 10.0 | 5.6 | 10.0 | 11.4 | .46 | .83 | .95 | |
| | | 12.0 | 4.2 | 10.1 | 12.5 | .35 | .84 | 1.04 | Block was soft and crumbly after 48 hrs. |
| Potassium acetate [2] | 32.78 | 6.0 | 34.4 | 34.4 | | 2.87 | 2.87 | | Block completely crumbled in 24 hrs. |
| | | 8.0 | 36.0 | 36.0 | | 3.00 | 3.00 | | Do. |
| | | 10.0 | 38.1 | 38.1 | | 3.10 | 3.10 | | Do. |
| Potassium acetate | 49.02 | 6.0 | 9.9 | 15.6 | 17.6 | .82 | 1.3 | 1.46 | Block completely crumbled in 72 hrs. |
| | | 8.0 | 11.6 | 32.9 | | .96 | 1.9 | | Block completely crumbled in 48 hrs. |
| | | 10.0 | 11.6 | 22.6 | | .96 | 1.8 | | Do. |
| | | 12.0 | 16.3 | 24.6 | | 1.36 | 2.0 | | |
| Potassium acetate [2] | 49.02 | 6.0 | 8.9 | 14.9 | 18.4 | .74 | 1.20 | 1.5 | |
| | | 8.0 | 11.1 | 17.3 | | .92 | 1.44 | 2.5 | Block crumbled in 72 hrs. |
| | | 10.0 | 10.0 | 24.5 | | .83 | 2.0 | | Block completely crumbled in 24 hrs. |
| | | 12.0 | 8.5 | 25.0 | | .70 | 2.0 | | Do. |

[1] Dissolution, as referred to here, indicates the loss in wt. of a block of gypsum, as result of reaction with chemical solutions.
[2] Gypsum obtained from different sample from the Southard, Oklahoma quarry.

EXAMPLE 2

Table II shows that the potassium salts of propionic acid will also convert gypsum to a pumpable sludge.

TABLE II.—DISSOLUTION OF GYPSUM IN POTASSIUM PROPIONATE

| Acid salt | Percent acid salt by weight | pH | $CaSO_4 \cdot 2H_2O$ dissolved | | | | | | Comments |
|---|---|---|---|---|---|---|---|---|---|
| | | | Gms./100 cc. after— | | | Lbs./gal. after— | | | |
| | | | 24 hr. | 48 hr. | 72 hr. | 24 hr. | 48 hr. | 72 hr. | |
| Potassium propionate | 30.28 | 8.0 | 2.0 | 6.0 | 31.9 | .16 | 0.5 | 2.5 | Block completely crumbled in 72 hrs. |
| Do | 30.28 | 10.0 | 2.5 | 13.0 | 38.9 | .20 | 1.08 | 3.2 | Do. |

EXAMPLE 3

Table III shows a comparison of sodium, ammonium and potassium salts of acetic acid. This data indicates that potassium acetate is the preferred.

TABLE III.—COMPARISON OF DISSOLUTION OF GYPSUM IN POTASSIUM ACETATE SOLUTIONS WITH SODIUM ACETATE AND AMMONIUM ACETATE SOLUTIONS AT VARIOUS pH SOLUTIONS

| Acid salt | Percent acid salt by weight | pH | $CaSO_4 \cdot 2H_2O$ dissolved | | | | Comments |
|---|---|---|---|---|---|---|---|
| | | | Gms./100 cc. after— | | Lbs./gal. after— | | |
| | | | 24 hr. | 48 hr. | 24 hr. | 48 hr. | |
| Sodium acetate | 26.24 | 6.0 | .8 | 1.1 | .06 | .06 | Sodium acetate reaction precipitate tended to adhere to the gyp block. |
| | | 8.0 | .8 | 1.0 | .06 | .08 | |
| | | 10.0 | 2.2 | 2.9 | .18 | .24 | |
| Ammonium acetate | 25.66 | 6.0 | .7 | 2.3 | .06 | .19 | Ammonium acetate reaction precipitate tended to adhere to gyp block. |
| | | 8.0 | .5 | 1.3 | .04 | .10 | |
| | | 10.0 | 0.8 | 1.4 | .11 | .11 | |
| Potassium acetate | 32.78 | 6.0 | 9.5 | 11.5 | .79 | .95 | Potassium acetate reaction precipitate sloughed off the surface of gyp block more readily than other acetate salts. |
| | | 8.0 | 10.6 | 12.6 | .88 | 1.05 | |
| | | 10.0 | 9.0 | 11.0 | .95 | .91 | |

EXAMPLE 4

Table IV shows the effect of temperature on the converting properties of potassium acetate. Increasing the temperature from 75° F. to 150° F. appeared to increase the rate of conversion of gypsum by the potassium acetate solution.

TABLE IV.—DISSOLUTION OF GYPSUM IN POTASSIUM ACETATE SOLUTIONS AT 150° F.

| Acid salt | Percent acid salt by weight | pH | $CaSO_4 \cdot 2H_2O$ dissolved | | | | Comments |
|---|---|---|---|---|---|---|---|
| | | | Gms./100 cc. after— | | Lbs./gal. after— | | |
| | | | 24 hr. | 48 hr. | 24 hr. | 48 hr. | |
| Potassium acetate | 16.34 | 8.0 | 1.0 | 3.0 | .08 | .25 | |
| | | 8.0 | 0.8 | 3.0 | .06 | .25 | |
| Potassium acetate | | 8.0 | 23.9 | 23.9 | 1.99 | 1.99 | Block completely crumbled in less than 24 hours. |
| | | 8.0 | 9.0 | 23.4 | .75 | 1.95 | Block completely crumbled in 48 hrs. |
| Potassium acetate | | 8.0 | 28.8 | | 2.4 | | Block completely crumbled in less than 24 hrs. |
| | | 8.0 | 26.1 | | 2.1 | | Do. |

EXAMPLE 5

Table V gives a comparison of potassium salts of formic acid, acetic acid, propionic acid and butyric acid.

TABLE V.—COMPARISON OF DISSOLUTION OF GYPSUM IN POTASSIUM ACETATE SOLUTIONS WITH OTHER POTASSIUM SALTS OF MONO-CARBOXYLIC ACIDS

| Acid salt | Salt | Percent acid | pH | $CaSO_4 \cdot 2H_2O$ dissolved | | | | Comments |
|---|---|---|---|---|---|---|---|---|
| | | | | Gms./100 cc. after— | | Lbs./gal. after— | | |
| | | | | 24 hr. | 48 hr. | 24 hr. | 48 hr. | |
| Potassium formate | 36.54 | 20 | 6.0 | 0.0 | 0.2 | 0.0 | 0.016 | |
| | | | 8.0 | 0.0 | 0.3 | 0.0 | 0.025 | |
| | | | 10.0 | 0.0 | 0.1 | 0.0 | 0.008 | |
| Potassium acetate | 36.54 | 20 | 6.0 | 9.5 | 11.5 | .79 | .95 | |
| | | | 8.0 | 10.6 | 12.6 | .88 | 1.05 | |
| | | | 10.0 | 9.0 | 11.0 | .75 | .91 | Not determined. |
| Potassium propionate | 30.28 | 20 | 6.0 | | | | | |
| | | | 8.0 | 2.0 | 6.0 | .16 | .50 | Block completely crumbled in 72 hrs. |
| | | | 10.0 | 2.5 | 13.0 | .20 | 1.08 | |
| Potassium butyrate | 28.64 | 20 | 6.0 | .1 | .1 | .008 | .008 | |
| | | | 8.0 | .1 | .4 | .008 | .032 | |
| | | | 10.1 | .1 | .1 | .008 | .008 | |

EXAMPLE 6

Table VI shows the improvement of the present invention over compositions presently in general use for the dissolution and dispersion of gypsum deposits.

TABLE VI.—COMPARISON OF VARIOUS TYPES OF CHEMICALS USED FOR GYPSUM REMOVAL

[Vol.=100 ml.; Solvation period: 24 and 48 hrs.; Concentration=wt. percent; temperature=72° F.]

| | Gypsum removed (lbs./gal.) | | | | | |
|---|---|---|---|---|---|---|
| | 24 hours | | | 48 hours | | |
| | Scale #1 | Scale #2 | Scale #3 | Scale #1 | Scale #2 | Scale #3 |
| Solvent types: | | | | | | |
| Inorganic converters:[1] | | | | | | |
| 12% NH$_4$HCO$_3$-NaCO$_3$ | 0.06 | 0.0 | 0.03 | 0.06 | 0.1 | 0.30 |
| 30% KOH | 0.00 | 0.0 | 0.0 | 0.00 | 0.00 | 0.0 |
| 30% NaOH | 0.23 | 0.17 | 0.17 | 0.50 | 0.4 | 0.17 |
| Inorganic converters:[2] | | | | | | |
| 12% NH$_4$HCO$_3$NaCO$_3$ | 0.35 | 0.37 | 0.40 | 0.6 | 0.74 | 0.80 |
| 30% KOH | 0.33 | 0.0 | 0.50 | 0.5 | 0.30 | 0.65 |
| 30% NaOH | 0.50 | 0.6 | 0.52 | 0.9 | 0.80 | 0.75 |
| Solvent types: | | | | | | |
| Organic converters:[1] | | | | | | |
| 30% potassium acetate | 1.2 | 0.90 | 0.7 | 3.0 | 1.7 | 1.50 |
| 30% Na citrate | 0.35 | 0.56 | 0.5 | 0.88 | 1.0 | 0.78 |
| 30% K glycolate | 0.36 | 0.50 | 0.5 | 0.45 | 0.66 | 0.94 |
| Solvents:[1] | | | | | | |
| 30% Na$_4$EDTA | 0.23 | 0.31 | 0.25 | 0.43 | 0.45 | 0.36 |
| 30% Na$_2$NTA | 0.01 | 0.04 | 0.01 | 0.01 | 0.04 | 0.01 |

[1] No acidizing after each solvation period.
[2] Acidized for 2 hours in 15% HCl after each solvation period.

NOTE: Scale #1=Quarry deposit, Southard, Oklahoma; Scale #2=Large crystal from Jordan Field, Andrews Co.; Scale #3=Small needle like crystals from Magutex Field, Andrews Co.

EXAMPLE 7

Table VII shows a typical use for the present invention in the area of oil production. Experiments were conducted in six (6) west Texas oil wells to determine the utility and efficiency of the present invention for removing gypsum deposits. The results are shown in the table below in barrels per day and show an improvement in oil or water production.

TABLE VII.—WELL TREATMENT HISTORIES

| | | | | | Production | | | |
|---|---|---|---|---|---|---|---|---|
| | | | | Volume (gal.) | Before | | After | |
| Area | Treating solution | Field | Formation | | Oil | Water | Oil | Water |
| West Texas | Potassium acetate | Cedar Lake | San Andres | 1,000 | 80 | 6 | 238 | 7 |
| | | ....do | ....do | 1,500 | 44 | 177 | 67 | 183 |
| | | ....do | ....do | 1,500 | 93 | 8 | 122 | 14 |
| | | ....do | ....do | 1,500 | 60 | 17 | 102 | 30 |
| | | Geo. Smith | Clear Fork | 2,000 | 36 | 36 | 67 | 38 |
| | | Slaughter | San Andres | 1,500 | 11 | 3 | 55 | 6 |

Although it is not a requirement of the invention, a surfactant may be added to the solution to improve wettability of the gypsum deposits being treated.

The above disclosure is illustrative and descriptive of the present and suitable variations may be made without departing from the spirit scope of the invention.

What is claimed is:

1. A process for the dissolution of gypsum comprising contacting said gypsum with an aqueous solution of a salt of a monocarboxylic acid and maintaining said contact for a time sufficient to convert said gypsum to a dispersible sludge, wherein said salt is selected from alkali metal salts and ammonium salts of said monocarboxylic acid and mixtures thereof, and further wherein the pH of said solution is in the range of about 6 to about 14.

2. The process of claim 1 wherein said monocarboxylic acid is selected from the group consisting of formic acid, acetic acid, propionic acid and butyric acid.

3. The process of claim 1 wherein said alkali metal is one of potassium and sodium.

4. The process of claim 1 wherein the concentration of said salt in said solution is in the range of about 0.5 to about 75 percent by weight of said solution.

5. The process of claim 1 wherein said alkali metal is potassium and said monocarboxylic acid is acetic acid.

6. The process of claim 5 wherein said concentration of said salt is in the range of about 10 to 50 percent by weight of said solution.

7. The process of claim 1 wherein the pH of said solution is in the range of about 9 to about 11.

8. A process for the dissolution of gypsum comprising contacting said gypsum with an aqueous potassium acetate solution and maintaining said contact for a time sufficient to convert said gypsum to a dispersible sludge, wherein said solution has a pH in the range of about 6 to about 14.

9. The process of claim 8 wherein the concentration of said potassium acetate in said solution is in the range of about 0.5 to about 75 percent by weight of said solution.

10. The process of claim 9 wherein the pH of said solution is in the range of about 9 to about 11.

11. The process of claim 10 wherein said solution is dispersed with a solvent selected from aromatic and straight-chain organic solvents prior to said contacting.

References Cited

UNITED STATES PATENTS

| | | | |
|---|---|---|---|
| 2,910,436 | 10/1959 | Fatt | 252—8.55 X |
| 3,447,963 | 6/1969 | Callahan | 252—80 X |
| 2,995,477 | 8/1961 | Florence | 252—82 X |
| 3,170,815 | 2/1965 | White | 252—8.55 X |
| 3,240,627 | 3/1966 | White | 252—8.55 X |
| 3,360,399 | 12/1967 | Knox | 134—3 |
| 3,527,609 | 9/1970 | Vinso | 134—3 |

ROBERT F. BURNETT, Primary Examiner

M. E. McCAMISH, Assistant Examiner

U.S. Cl. X.R.

21—2.7; 134—2, 3, 41; 252—8.55 B, 8.55 C, 86